US010246541B2

(12) United States Patent
Chien

(10) Patent No.: US 10,246,541 B2
(45) Date of Patent: Apr. 2, 2019

(54) OPHTHALMIC LENS AND METHOD FOR MAKING THE SAME

(71) Applicant: MiiCs & Partners (Shenzhen) Co., Ltd., Shenzhen (CN)

(72) Inventor: Hsiu-Wen Chien, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/490,470

(22) Filed: Apr. 18, 2017

(65) Prior Publication Data

US 2018/0230257 A1 Aug. 16, 2018

(30) Foreign Application Priority Data

Feb. 14, 2017 (TW) .............................. 106104716 A

(51) Int. Cl.
| | |
|---|---|
| *C08F 230/02* | (2006.01) |
| *C08J 3/28* | (2006.01) |
| *B29D 11/00* | (2006.01) |
| *G02B 1/04* | (2006.01) |
| *B29K 79/00* | (2006.01) |

(52) U.S. Cl.
CPC ...... *C08F 230/02* (2013.01); *B29D 11/00134* (2013.01); *C08J 3/28* (2013.01); *G02B 1/041* (2013.01); *G02B 1/043* (2013.01); *B29K 2079/00* (2013.01); *B29K 2995/0018* (2013.01); *C08F 2800/20* (2013.01); *C08J 2343/02* (2013.01)

(58) Field of Classification Search
CPC ...... C08F 230/02; C08F 2800/20; C08F 2/50; G02B 1/041; G02B 1/043; B29D 11/00134; C08J 3/28; C08J 2343/02; B29K 2995/0018; B29K 2079/00
See application file for complete search history.

(56) References Cited

U.S. PATENT DOCUMENTS

| | | | | |
|---|---|---|---|---|
| 4,758,448 A | * | 7/1988 | Sandvig | ........... B29D 11/00865 264/1.7 |
| 4,892,402 A | * | 1/1990 | Sawamoto | ....... B29D 11/00038 351/159.33 |
| 5,985,420 A | * | 11/1999 | Haga | ..................... G02B 1/041 428/212 |
| 8,163,357 B2 | * | 4/2012 | Engardio | ............... G02B 1/105 426/446 |

* cited by examiner

*Primary Examiner* — Jessica M Roswell
(74) *Attorney, Agent, or Firm* — ScienBiziP, P.C.

(57) ABSTRACT

A method for making a biodegradable ophthalmic lens includes steps of mixing poly[bis(methacrylate)phosphazene], hydrophilic monomers, and a photoinitiator to form a mixture; feeding the mixture into a mold, and heating or exposing the mixture to ultraviolet radiation, thereby causing the poly[bis(methacrylate)phosphazene] to function as a cross-linking agent. Such cross-linking agent undergoes a polymerization reaction with the hydrophilic monomers and the photoinitiator to form a polyphosphazenes hydrogel; and the polyphosphazenes hydrogel is then removed from the mold.

8 Claims, 3 Drawing Sheets

OPHTHALMIC LENS AND METHOD FOR MAKING THE SAME

FIELD

The subject matter herein generally relates to an ophthalmic lens and a method for making the ophthalmic lens.

BACKGROUND

Contact lenses are commonly worn by users to correct vision, or for cosmetic or therapeutic reasons. However, the contact lens cannot biodegradable, which may cause pollution to the environment.

BRIEF DESCRIPTION OF THE DRAWINGS

Implementations of the present technology will now be described, by way of example only, with reference to the attached figures.

DETAILED DESCRIPTION

Figure 1:
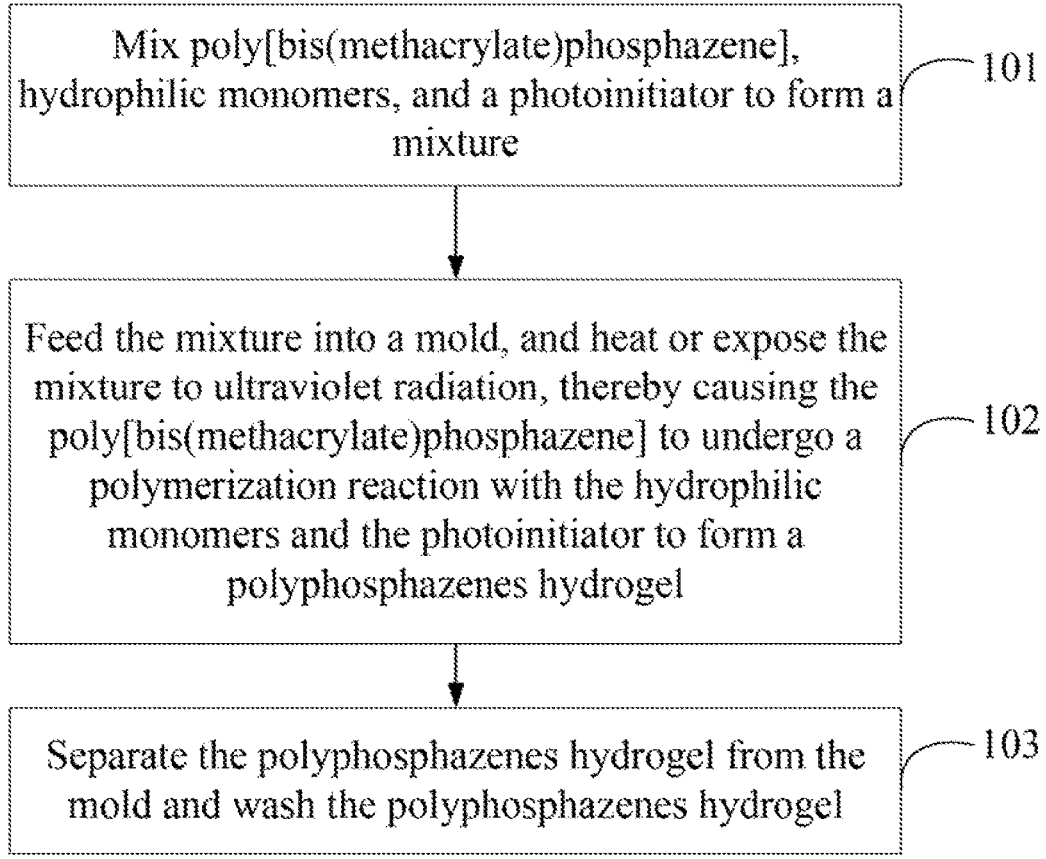
FIG. 1 is a flowchart of an exemplary embodiment of a method for making an ophthalmic lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

The term "comprising," when utilized, means "including, but not necessarily limited to"; it specifically indicates open-ended inclusion or membership in the so-described combination, group, series and the like.

Figure 3:
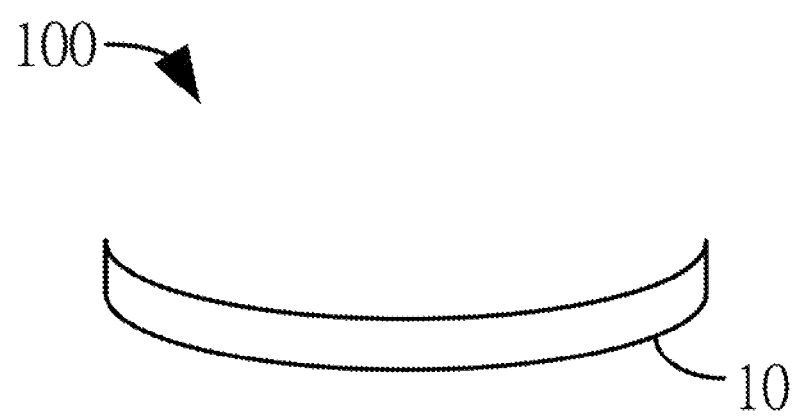
FIG. 3 is a diagrammatic view of an exemplary embodiment of an ophthalmic lens.

FIG. 1 illustrates a flowchart of an embodiment for a method for making an ophthalmic lens 100 (shown in FIG. 3). The exemplary method is provided by way of example, as there are a variety of ways to carry out the method. Each block shown in the figure represents one or more processes, methods or subroutines, carried out in the exemplary method. Furthermore, the illustrated order of blocks is by example only, and the order of the blocks can change. Additional blocks may be added or fewer blocks may be utilized, without departing from this disclosure. The exemplary method can begin at block 101.

At block 101, a mixture is formed by mixing poly[bis(methacrylate)phosphazene] (chemical formula:

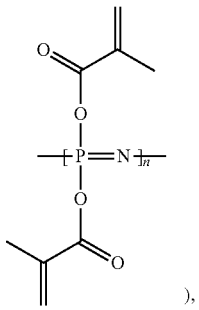

), hydrophilic monomers (chemical formula:

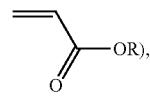

and a photoinitiator.

The poly[bis(methacrylate)phosphazene] has a mass percentage of about 0.05% to about 46% of a total mass of the mixture. The hydrophilic monomers have a mass percentage of about 40% to about 98% of the total mass of the mixture. The photoinitiator has a mass percentage of about 0.1% to about 15% of the total mass of the mixture.

The hydrophilic monomer may be selected from a group consisting of 2-hydroxyethyl methacrylate (HEMA), methylacrylic acid (MAA), N,N'-dimethylacrylamide (DMA), methyl methacrylate (MMA), N-vinyl pyrrolidone (NVP), polyethylene glycol maleate (PEGMA), tris(trimethylsilyl) silane (TRIS), and polydimethylsiloxane (PDMS), or any combination thereof.

The photoinitiator may be selected from a group consisting of Irgacure-1173 (trade name, available commercially from Chemical Industries Basel (CIBA) Corporation as a clear liquid) and azodiisobutyronitrile (AIBN), or any combination thereof.

In at least one exemplary embodiment, a solvent can be further added to the mixture. The solvent may be selected from a group consisting of methanol and 1-hexanol, or any combination thereof. The solvent and the mixture are in a ratio of about 48:52 or less by weight.

Figure 2:
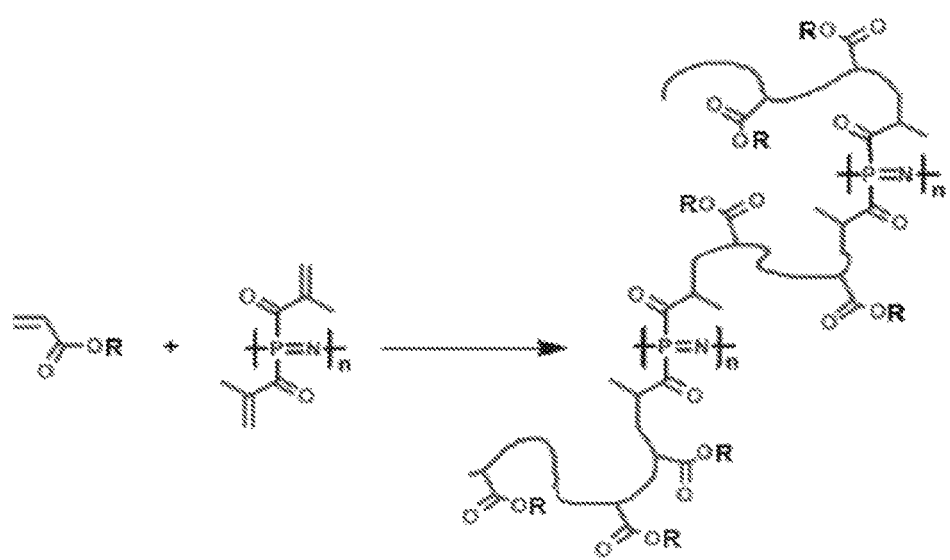
FIG. 2 shows a polymerization reaction of the method in FIG. 1.

At block 102, the mixture is fed into a mold and is heated or exposed to ultraviolet radiation, to cause the poly[bis(methacrylate)phosphazene] to function as a cross-linking agent. Such a cross-linking agent undergoes a polymerization reaction with the hydrophilic monomers and the photoinitiator to form a polyphosphazenes hydrogel. The polymerization reaction is shown in FIG. 2.

In at least one exemplary embodiment, a time period for the polymerization reaction is about 10 min to about 30 min.

At block 103, the polyphosphazenes hydrogel is separated from the mold and washed, thereby forming the ophthalmic lens 100.

In at least one exemplary embodiment, the polyphosphazenes hydrogel is washed by distilled water.

EXAMPLE 1

A mixture was formed by mixing poly[bis(methacrylate) phosphazene], HEMA, DMA, and Irgacure-1173. The poly

[bis(methacrylate)phosphazene] had a mass percentage of 3.5% of a total mass of the mixture. The HEMA had a mass percentage of 92% of the total mass of the mixture. The DMA had a mass percentage of 4% of the total mass of the mixture. The Irgacure-1173 had a mass percentage of 0.5% of the total mass of the mixture. The mixture was fed into a mold and was exposed to ultraviolet radiation (365 nm) for 10 mins to form the polyphosphazenes hydrogel. The polyphosphazenes hydrogel was washed with distilled water, thereby forming the ophthalmic lens.

EXAMPLE 2

A mixture was formed by mixing poly[bis(methacrylate) phosphazene], PEGMA, and Irgacure-1173. The poly[bis (methacrylate)phosphazene] had a mass percentage of 36% of a total mass of the mixture. The PEGMA had a mass percentage of 63% of the total mass of the mixture. The Irgacure-1173 had a mass percentage of 1% of the total mass of the mixture. Methanol was added to the mixture. The methanol and the mixture are in a ratio of 1:3 by weight. The mixture was fed into a mold and was exposed to ultraviolet radiation (365 nm) for 15 mins to form the polyphosphazenes hydrogel. The polyphosphazenes hydrogel was washed with distilled water, thereby forming the ophthalmic lens.

EXAMPLE 3

A mixture was formed by mixing poly[bis(methacrylate) phosphazene], TRIS, PDMS, HEMA, DMA, and AIBN. The poly[bis(methacrylate)phosphazene] had a mass percentage of 3.2% of a total mass of the mixture. The TRIPS had a mass percentage of 41% of the total mass of the mixture. The PDMS had a mass percentage of 2% of the total mass of the mixture. The HEMA had a mass percentage of 25% of the total mass of the mixture. The DMA had a mass percentage of 28% of the total mass of the mixture. The AIBN had a mass percentage of 0.8% of the total mass of the mixture. Methanol was added to the mixture. The methanol and the mixture are in a ratio of 7:13 by weight. The mixture was fed into a mold and was heat under 70 degrees Celsius for 15 min to form the polyphosphazenes hydrogel. The polyphosphazenes hydrogel was washed with distilled water, thereby forming the ophthalmic lens.

FIG. 3 illustrates an exemplary embodiment of an ophthalmic lens 100 made by the above method. The ophthalmic lens 100 can be an eyeglass, a contact lens, or an intraocular lens (IOL). The ophthalmic lens 100 comprises a matrix 10. The matrix 10 is made by polyphosphazenes hydrogel.

Polyphosphazenes are hybrid polymers with alternating phosphorus-nitrogen elements in the backbone and organic side groups attached to the backbone so that the polyphosphazenes can have properties of both the organic and inorganic polymers. The backbone of the polyphosphazenes is biodegradable, thereby preventing the ophthalmic lens 100 from generating pollution to the environment.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for making an ophthalmic lens comprising:
   mixing poly[bis(methacrylate)phosphazene], hydrophilic monomers, and a photoinitiator to form a mixture, wherein the poly[bis(methacrylate)phosphazene] has a mass percentage of 3.2% to 3.5% of a total mass of the mixture, the hydrophilic monomers have a mass percentage of 96% of the total mass of the mixture, the photoinitiator has a mass percentage of 0.5% to 0.8% of the total mass of the mixture;
   feeding the mixture into a mold, and heating or exposing the mixture to ultraviolet radiation, thereby causing the poly[bis(methacrylate)phosphazene] to function as a cross-linking agent which undergoes a polymerization reaction with the hydrophilic monomers and the photoinitiator to form a polyphosphazenes hydrogel; and
   separating the polyphosphazenes hydrogel from the mold, thereby the polyphosphazenes hydrogel forming the ophthalmic lens.

2. The method of claim 1, wherein the hydrophilic monomers are selected from a group consisting of N,N'-dimethylacrylamide, polyethylene glycol maleate, tris(trimethylsilyl)silane, and polydimethylsiloxane, or any combination thereof.

3. The method of claim 1, wherein the photoinitiator is azodiisobutyronitrile.

4. The method of claim 1, wherein a solvent is further added to the mixture, the mixture and the solvent are fed into the mold together for the polymerization reaction, the solvent and the mixture are in a ratio less than or equal to 7:20 by weight.

5. The method of claim 4, wherein the solvent is 1-hexanol.

6. The method of claim 1, wherein a time period for the polymerization reaction is from 10 min to 30 min.

7. The method of claim 1, further comprising:
   washing the polyphosphazenes hydrogel.

8. The method of claim 7, wherein the polyphosphazenes hydrogel is washed by distilled water.

\* \* \* \* \*